United States Patent
Johnson et al.

(10) Patent No.: US 9,937,918 B2
(45) Date of Patent: Apr. 10, 2018

(54) HYBRID SWEEPER-SCRUBBER CONTROL METHOD AND SYSTEM

(75) Inventors: Kale R. Johnson, Minneapolis, MN (US); Hanafi Habbas, Blaine, MN (US); Wayne G. Lorenz, West St. Paul, MN (US)

(73) Assignee: NILFISK A/S, Brondby (DK)

( * ) Notice: Subject to any disclaimer, the term of this patent is extended or adjusted under 35 U.S.C. 154(b) by 1025 days.

(21) Appl. No.: 14/113,137

(22) PCT Filed: Apr. 20, 2012

(86) PCT No.: PCT/US2012/034465
§ 371 (c)(1),
(2), (4) Date: Jan. 7, 2014

(87) PCT Pub. No.: WO2012/145635
PCT Pub. Date: Oct. 26, 2012

(65) Prior Publication Data
US 2014/0125122 A1 May 8, 2014

Related U.S. Application Data

(60) Provisional application No. 61/477,425, filed on Apr. 20, 2011.

(51) Int. Cl.
*B60W 20/40* (2016.01)
*B60W 20/50* (2016.01)
(Continued)

(52) U.S. Cl.
CPC .............. *B60W 20/40* (2013.01); *B60K 6/46* (2013.01); *B60L 11/12* (2013.01); *B60W 10/30* (2013.01);
(Continued)

(58) Field of Classification Search
CPC ...................................................... B60L 11/12
See application file for complete search history.

(56) References Cited

U.S. PATENT DOCUMENTS 3,515,968 A * 6/1970 Crawford ................. B60K 6/46
180/65.245
4,313,080 A * 1/1982 Park ........................ B60L 11/14
180/65.225
(Continued)

FOREIGN PATENT DOCUMENTS

DE 102008049225 A1 4/2010
EP 1106411 6/2001
(Continued)

OTHER PUBLICATIONS

English Version of Montipo: EP1106411 (A2)—Jun. 13, 2001.*
(Continued)

*Primary Examiner* — Jared Fureman
*Assistant Examiner* — James Evans
(74) *Attorney, Agent, or Firm* — Schwegman Lundberg & Woessner, P.A.

(57) ABSTRACT

The invention relates to a method and system for controlling an engine (552) in a sweeper-scrubber. An electrical system alternator (554) provides power to at least one cleaning function (576, 578, 580) of a self-propelled hybrid vehicle and to driven wheels. The operational load is monitored, and the running state of an internal combustion engine (552) is controlled based on the monitored operational load. A threshold charge, of an electrical system battery pack (556) is maintained.

13 Claims, 5 Drawing Sheets

(51) Int. Cl.
  *B60L 11/12* (2006.01)
  *B60W 30/18* (2012.01)
  *B60W 50/04* (2006.01)
  *B60K 6/46* (2007.10)
  *B60W 10/30* (2006.01)
  *B60W 30/188* (2012.01)
  *B60W 10/06* (2006.01)
  *B60W 20/00* (2016.01)

(52) U.S. Cl.
  CPC ........ *B60W 20/50* (2013.01); *B60W 30/1882* (2013.01); *B60W 30/18127* (2013.01); *B60W 50/04* (2013.01); *B60W 10/06* (2013.01); *B60W 20/00* (2013.01); *B60W 2710/0644* (2013.01); *B60W 2710/244* (2013.01); *B60Y 2200/15* (2013.01); *Y02T 10/6217* (2013.01)

(56) References Cited

U.S. PATENT DOCUMENTS

| | | | |
|---|---|---|---|
| 6,349,545 | B1 | 2/2002 | Bassanini et al. |
| 7,183,746 | B1* | 2/2007 | Carter .................. B60L 11/126 |
| | | | 180/65.245 |
| 7,416,039 | B1* | 8/2008 | Anderson ................ B60K 1/00 |
| | | | 180/165 |
| 7,497,285 | B1* | 3/2009 | Radev ..................... B60K 6/26 |
| | | | 180/65.225 |
| 2003/0159232 | A1 | 8/2003 | Hekman et al. |
| 2004/0129470 | A1* | 7/2004 | Huelser .................. B60K 6/485 |
| | | | 180/170 |
| 2005/0019173 | A1* | 1/2005 | Wakitani ................. B60K 6/46 |
| | | | 417/313 |
| 2005/0072608 | A1* | 4/2005 | Johnston .................. B60K 6/46 |
| | | | 180/65.245 |
| 2007/0068714 | A1* | 3/2007 | Bender .................... B60K 6/28 |
| | | | 180/65.29 |
| 2008/0156553 | A1* | 7/2008 | Hoogenraad ............ B60K 6/48 |
| | | | 180/65.29 |
| 2011/0198136 | A1 | 8/2011 | Teague et al. |
| 2011/0231046 | A1 | 9/2011 | Bissontz |

FOREIGN PATENT DOCUMENTS

| | | |
|---|---|---|
| WO | WO-2012145635 A2 | 10/2012 |
| WO | WO-2012145635 A3 | 10/2012 |

OTHER PUBLICATIONS

"European Application Serial No. 12722952.4, Office Action dated Dec. 11, 2013", 2 pgs.

"European Application Serial No. 12722952.4, Response filed Jun. 18, 2014 to Office Action dated Dec. 11, 2013", 20 pgs.

"International Application Serial No. PCT/US2012/034465, International Preliminary Report on Patentability dated Oct. 31, 2013", 11 pgs.

"International Application No. PCT/US2012/034465, Invitation to Pay Additional Fees, dated Jul. 2, 2012", 7 pgs.

"International Application Serial No. PCT/US2012/034465, Search Report dated Oct. 9, 2012", 11 pgs.

"International Application Serial No. PCT/US2012/034465, Written Opinion dated Oct. 9, 2012", 10 pgs.

European Application Serial No. 12722952.4, Communication Pursuant to Article 94(3) EPC dated Oct. 6, 2017, 4 pgs.

* cited by examiner

HYBRID SWEEPER-SCRUBBER CONTROL METHOD AND SYSTEM

CLAIM OF PRIORITY

This application is a U.S. National Stage Application filed under 35 U.S.C. § 371 of International Application Serial No. PCT/US2012/034465, filed Apr. 20, 2012, and published on Oct. 26, 2012 as WO 2012/145635 A2, which claims the benefit of priority of U.S. Provisional Application No. 61/477,425, filed Apr. 20, 2011, entitled "HYBRID SWEEPER-SCRUBBER," all of which applications and publication are herein incorporated by reference in their entireties.

BACKGROUND OF THE INVENTION

The present invention relates generally to a cleaning control apparatus. More specifically, the present invention relates to a hybrid sweeper-scrubber having both fuel-powered and battery-powered modes.

Industrial and commercial floors are cleaned on a regular basis for aesthetic and sanitary purposes. There are many types of industrial and commercial floors ranging from hard surfaces, such as concrete, terrazzo, wood, and the like, which can be found in factories, schools, hospitals, and the like, to softer surfaces, such as carpeted floors found in restaurants and offices. Different types of floor cleaning equipment, such as scrubbers, sweepers, and extractors, have been developed to properly clean and maintain these different floor surfaces.

A typical scrubber is a walk-behind or drivable, self-propelled, wet process machine that applies a liquid cleaning solution from an onboard cleaning solution tank onto the floor through nozzles fixed to a forward portion of the scrubber. Rotating brushes forming part of the scrubber rearward of the nozzles agitate the solution to loosen dirt and grime adhering to the floor. The dirt and grime become suspended in the solution, which is collected by a vacuum squeegee fixed to a rearward portion of the scrubber and deposited into an onboard recovery tank.

Scrubbers are very effective for cleaning hard surfaces. Unfortunately, debris on the floor can clog the vacuum squeegee, and thus, the floor should be swept prior to using the scrubber. Thus, sweepers are commonly used to sweep a floor prior to using a scrubber. A typical sweeper is a self propelled, walk-behind, or drivable dry process machine which picks debris off a hard or soft floor surface without the use of liquids. The typical sweeper has rotating brushes which sweep debris into a hopper or "catch bin."

Combination sweeper-scrubbers have been developed that provide the sweeping and scrubbing functionality in a single unit. Prior art sweeper-scrubber systems are available in both fuel powered and battery powered designs. One exemplary fuel powered design is the 7765 Rider Industrial Sweeper-Scrubber from Nilfisk-Advance (http://www.advance-us.com/products/industrial/sweeper-scrubbers/7765.aspx). One exemplary battery powered design is the Captor® Industrial Sweeper-Scrubber also from Nilfisk-Advance (http://www.advance-us.com/products/industrial/sweeper-scrubbers/captor5400.aspx). More recently, "hybrid" type machines that are capable of operating in fuel or battery powered modes have also been developed, such as the one described in European Patent No. EP 1106411 B1.

OVERVIEW

This overview is intended to provide an overview of subject matter of the present patent application. It is not intended to provide an exclusive or exhaustive explanation of the invention. The detailed description is included to provide further information about the present patent application.

In an example, power can be provided, via an electrical system alternator, to at least one cleaning function of a self-propelled hybrid vehicle. An operational load, including an operational state of the at least one cleaning function of the self-propelled hybrid vehicle can be monitored. A running state of an internal combustion engine can be controlled to produce a power output based on the monitored operational load. A threshold charge can be maintained, via the electrical system alternator, of an electrical system battery pack of the self-propelled hybrid vehicle.

In an example, a number of running modes of the self-propelled hybrid vehicle can be alternated between, the number of running modes including at least an electric mode and a hybrid mode.

In an example, running the electric mode can include monitoring the electrical system alternator for an occurrence of an electrical component fault, and taking protective measures if the occurrence of an electrical component fault is detected, protective measures can include at least one of providing a warning to an operator and shutting down the self-propelled hybrid vehicle.

In an example, running the hybrid mode can include monitoring the self-propelled hybrid vehicle for an occurrence of an engine component fault and alternating to the electric mode if the occurrence of an engine component fault is detected.

In an example, the method can include overriding alternating between the number of running modes if an override mode is activated.

In an example, the method can include monitoring the electrical system alternator at a designated time interval.

In an example, the method can include starting the self-propelled hybrid vehicle via the electrical system alternator.

In an example, the method can include starting the self-propelled hybrid vehicle via an engine alternator.

In an example, controlling the running state can include adjusting a running speed of the internal combustion engine to a distinct running speed to produce the power output based on the monitored operational load.

In an example, the method can include adjusting the running speed based on a number of cleaning functions with an active operation state.

In an example, the method can include adjusting the running speed when the monitored operational load is greater than at least a threshold operational load.

In an example, the method can include adjusting the running speed to an idle speed.

In an example, the method can include maintaining at least a threshold engine speed for a number of cleaning functions to operate during a manual adjustment of the running speed of the engine.

In an example, a self-propelled hybrid vehicle propulsion system can include an internal combustion engine operably coupled to an electrical system alternator, the electrical system alternator configured to charge an electrical system battery pack and the electrical system alternator can be operably coupled to a number of controllers. The number of controllers can be operably coupled to the electrical system battery pack, and the number of controllers can include a main controller configured to control a running state of the internal combustion engine of the self-propelled hybrid vehicle based on a monitored operational load.

In an example, the main controller can be configured to monitor the electrical system alternator to detect failures.

In an example, the system can include a switching component configured to alternate the self-propelled hybrid vehicle between a number of running modes, the number of running modes including at least an electric mode and a hybrid mode.

In an example, the system can include a sub-system from the group of at least a sweep sub-system, a scrub sub-system, and a recovery sub-system.

In an example, the system can include a user interface configured to display a status of the sub-system.

In an example, the system can include, a running state override switching component configured to override an operator initiated running state if the operator running initiated state is below a threshold run state based on the monitored operational load.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION OF THE INVENTION

The present invention relates generally to a cleaning apparatus. More specifically, the present invention relates to a hybrid sweeper-scrubber that may be operated in a fuel-powered or battery-powered mode.

Figure 1:
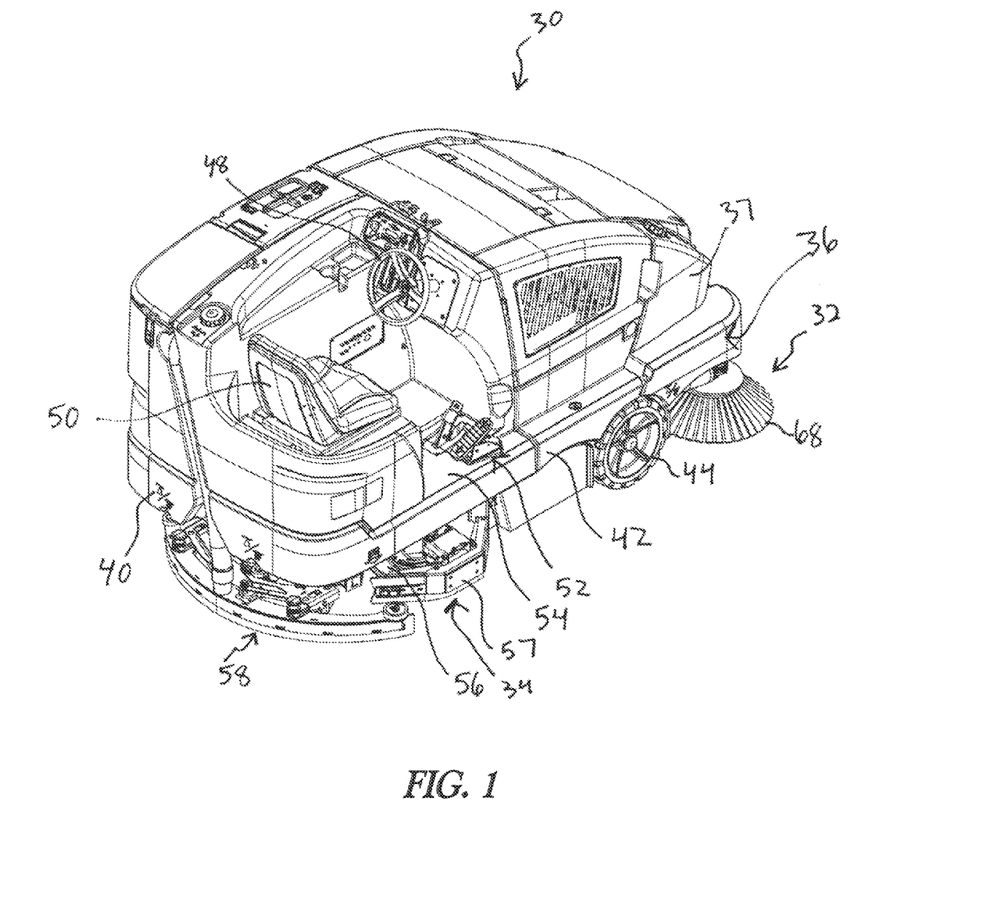
FIG. 1 is a top perspective view of a hybrid sweeper-scrubber that can utilize a scrub deck retraction apparatus in accordance with the present patent application.
Figure 2:
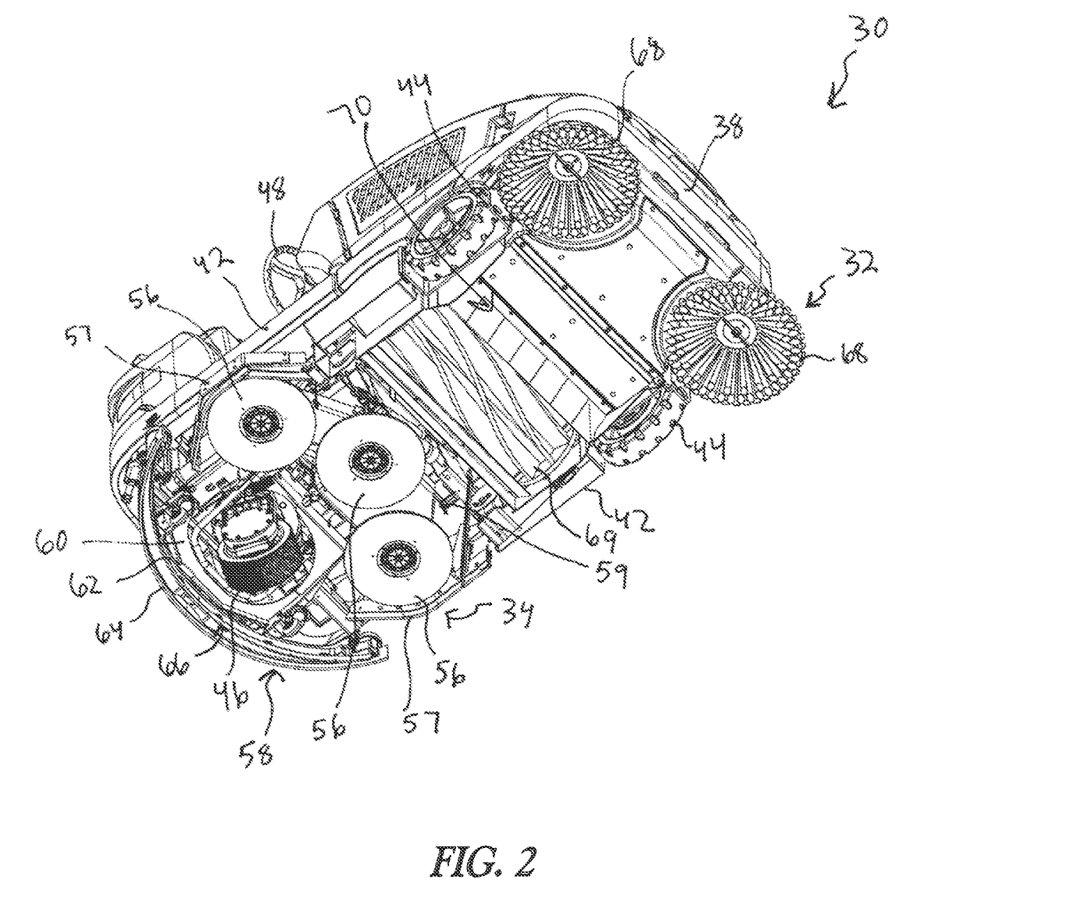
FIG. 2 is a bottom perspective view of the hybrid sweeper-scrubber of FIG. 1.
Figure 3:
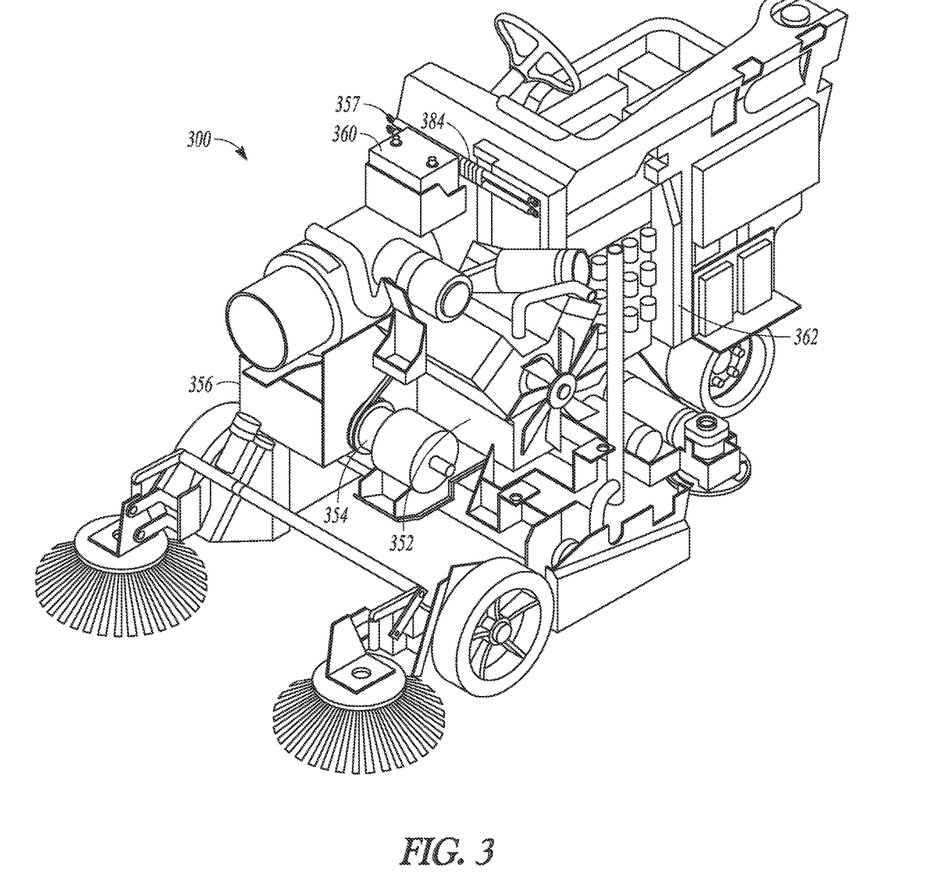
FIG. 3 is an internal perspective of the hybrid sweeper-scrubber of FIG. 1.

One exemplary but non-limiting embodiment of the hybrid sweeper-scrubber of the present invention is illustrated in FIGS. 1 and 2. An exemplary schematic diagram of the hybrid sweeper-scrubber components is illustrated in FIG. 3. The sweeper-scrubber of FIGS. 1-3 provides all of the functionality of a prior art sweeper-scrubber system through the use of electric components (with the exception of hydraulics to operate the hopper for debris collection).

The present control method and system for the hybrid sweeper-scrubber can include an internal combustion engine and electrical system battery pack to power the hybrid sweeper-scrubber and operate a number of accessories and cleaning functions. The present control method and system can include common components between the engine and electrical systems. Benefits of such embodiments can include reduced material costs, reduced component maintenance, reduced overall size of the hybrid sweeper-scrubber, elimination of a number of hydraulic components, lower emissions, or less fuel consumption.

FIGS. 1 and 2 are top and bottom perspective views, respectively, of an example of a sweeper-scrubber 30 that can utilize a scrub brush retraction apparatus in accordance with the present patent application. As illustrated in FIGS. 1 and 2, the sweeper-scrubber 30 can include a sweeper system 32 for sweeping a floor surface and a scrubber system 34 for scrubbing the floor surface. Thus, as will be discussed in further detail below, the sweeper-scrubber 30 can be operable to sweep dirt and debris from the floor surface, spray a liquid cleaning solution from an onboard cleaning solution tank onto the floor being cleaned, and agitate the cleaning solution. Suction means can then be used to draw the cleaning solution into an onboard recovery tank.

Providing a floor cleaning system having both a sweeper system 32 and a scrubber system 34 can allow the operator to perform both "dry" and "wet" cleaning with the same system. These sweeping and scrubbing modes can be operated either separately or simultaneously depending upon the type of cleaning required.

Figure 5:
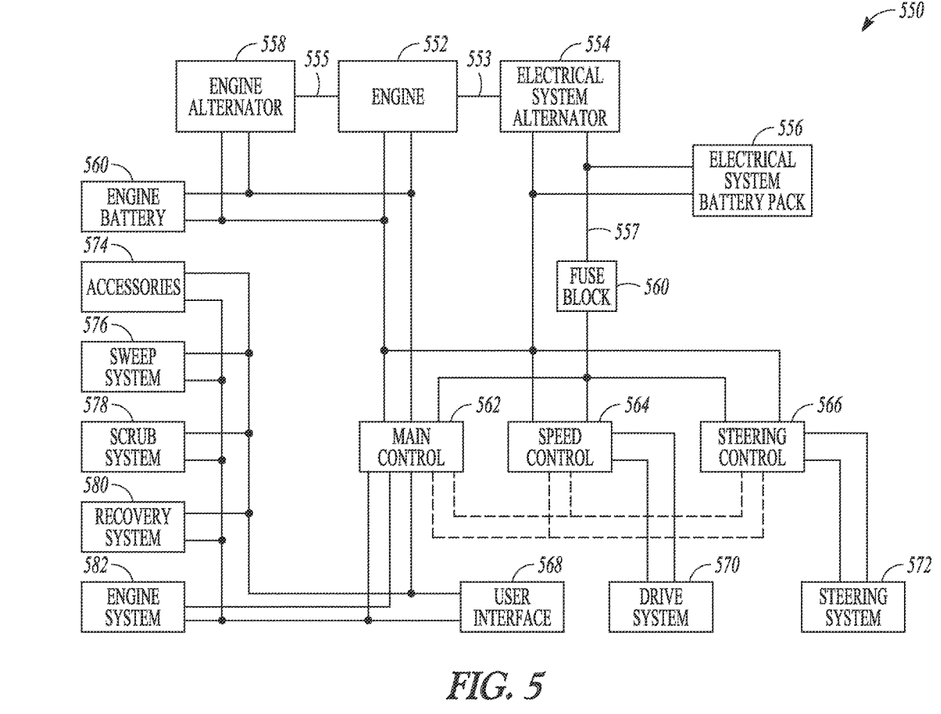
FIG. 5 is an exemplary schematic diagram of various components of a control method for the hybrid sweeper-scrubber of FIG. 1.

As further illustrated FIGS. 1 and 2, the sweeper-scrubber 30 can include a chassis 36 supporting a machine body 37 and having a forward end 38 and a rearward end 40 joined by sides 42. The chassis 36 can be supported by one or more floor engaging front wheels 44 and one or more rear steerable wheels 46. The one or more rear steerable wheels 46 can be operatively connected to a steering wheel 48 through the chassis 36. Alternatively, the chassis can be supported by one or more front steerable wheels and one or more floor engaging rear wheels. The steering wheel can be part of a steering control system (e.g., 366, FIG, 5) as described herein.

A driver seat 50 can be supported by the machine body 37 rearward of the steering wheel 48 for use by an operator of the sweeper-scrubber 30. The operator can sit on the driver seat 50 to operate the steering wheel 48 and foot operated control pedals 52, such as a brake and an accelerator, supported above a chassis top surface 54 The accelerator can be included in a speed control system (e.g., 364, FIG. 5), as described herein.

In operation, a spray nozzle can spray a liquid cleaning solution from an onboard cleaning solution tank onto the floor being cleaned. The cleaning solution can be gravity fed through the spray nozzle, or alternatively pumped out of the cleaning solution tank through the spray nozzle. The spray nozzle can be integrated into a scrub sub-system (e.g., 378, FIG. 5), as described herein. The cleaning solution sprayed onto the floor can then be agitated by one or more ground engaging scrub brushes, such as scrub brushes 56A, 56B, and 56C. In an example, the scrub brushes 56A-56C together form a portion of a scrub deck assembly 59 of the scrubber system 34 adjacent to a bottom surface of the chassis 36. As illustrated in FIGS. 1 and 2, the outside scrub brush 56A and an associated skirt 57A can protrude from the side of the sweeper-scrubber 30 to improve scrubbing close to walls and other obstacles. As will be discussed in detail below, the outside scrub brush 56A can be attached to a pivoting arm that can allow the scrub brush 56A and the adjacent side skirt 57A to swing around a vertical axis, such that it can travel rearward and/or inward, to retract under the machine and prevent damage to the scrub deck assembly 59 caused by hitting obstacles. The scrub brushes 56A, 56B, 56C and associated components can be part of a sweep subsystem (e,g., 376, FIG. 5), as described herein.

As illustrated in FIGS. 1 and 2, the ground engaging scrub brushes 56A-56C can have substantially parallel axes of rotation that are generally perpendicular to the floor surface.

The scrub brushes 56A-56C can be rotatably driven by a suitable motor, and can be configured to agitate the cleaning solution sprayed onto the floor surface to dislodge dirt and grime adhered thereto. In addition to the scrub brushes 56A-56C, the scrubber system 34 can further include a floor engaging vacuum squeegee assembly 58 positioned proximal the chassis rearward end 40. The agitated cleaning solution and suspended dirt and grime can be drawn off the floor surface through the squeegee assembly 58 and into the recovery tank for disposal, such as with a recovery subsystem (380, FIG. 5), as described herein.

The squeegee assembly 58 can be coupled to a squeegee support bracket 60 pivotally attached relative to the chassis 36, and can be moved between an operating position and a stored position (when not in use). The squeegee assembly 58, which can be operable to dry the floor being cleaned by the sweeper-scrubber 30, can include a forward arcuate squeegee blade 62 nested within a rearward arcuate squeegee blade 64. In an example, the nested squeegee blades 62 and 64 can extend substantially across the width of the sweeper-scrubber 30 and can define a crescent shaped vacuum zone 66. The squeegee blades 62 and 64 can be formed from any flexible material that can sealingly engage the floor, including elastomeric materials such as rubber, plastic, or the like.

The forward squeegee blade 62 can be configured to collect the cleaning solution on the floor, and can include notches in its floor engaging edge which allows the cleaning solution to enter the vacuum zone 66. The rearward squeegee blade 64 can include a continuous floor engaging edge in order to prevent the escape of the cleaning solution rearwardly from the vacuum zone 66.

As illustrated in FIGS. 1 and 2, a pair of side brushes 68 can be rotatably mounted proximal the chassis forward end 38 and forward of the ground engaging agitation brushes 56. The side brushes 68 can be driven by a suitable motor controlled by control circuitry. Each side brush 68 can be rotatable about a substantially vertical axis proximal one of the chassis sides 42, and can be configured to urge debris towards a centerline of the chassis 36 for pick-up by a main sweeper brush 69. In an example, the main sweeper brush 69 can be rotatable about a substantially horizontal axis. As illustrated in FIGS. 1 and 2, each side brush 68 can extend radially from its vertical axis past one side 42 of the chassis 36 in order to sweep the floor along a wall or other vertical or angled surface. Similar to the squeegee assembly 58, the side brushes 68 can be vertically movable between an operating position and a storage position.

FIG. 3 is an internal perspective of the hybrid sweeper-scrubber of FIG. 1. As illustrated FIG. 3, the hybrid sweeper-scrubber includes an internal combustion engine 352 that drives an electrical system alternator 354 via a suitable belt. The internal combustion engine 352 can include a number of combustible fuels including, but not limited to, diesel, natural gas, propane, ethanol, petroleum, and the like. The electrical system alternator 354 can be configured so as to start the engine and system of the hybrid-sweeper scrubber. In an example, the electrical system alternator can include a 42V alternator and regulator. The electrical system alternator 354 charges an electrical system battery pack 356 and is operably coupled to a main controller 362, a speed controller (not shown) (e.g., FIG. 5, 364), and a steering controller (not shown) (e.g., FIG. 5, 366). The electrical system alternator can provide enough power so as to start the engine 352 of the hybrid sweeper-scrubber. The hybrid sweeper-scrubber can alternate between a number of running modes of the self-propelled hybrid vehicle, including at least an electric running mode and a hybrid running mode, the hybrid mode include running the engine on a combustible fuel and powering a number of cleaning functions (e.g., sub-systems) via the electrical system batter pack or electrical system alternator.

In an example, the electrical system battery pack 356 can include a number of 36V batteries. The main controller 362, speed controller, and steering controller are also coupled to the electrical system battery pack 352. The hybrid sweeper-scrubber can provide steering such as a wire steering system. A traction drive motor/system may be controlled by the speed controller. As described herein, engine speed can be controlled through the main controller, so as to adjust the engine operation to account for whichever cleaning functions are operating.

Now that an example of a floor cleaning system has been described that can utilize the control method of the present patent application, the method and structure of an exemplary control method 430 will be described in detail with reference to FIGS. 4-5.

Figure 4:
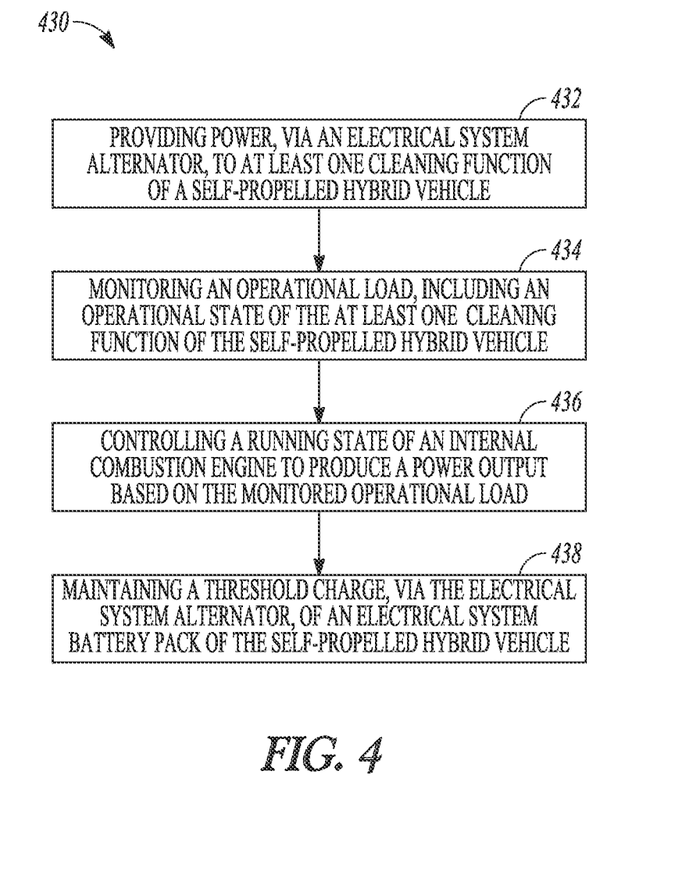
FIG. 4 is a flow chart illustrating an example of a control method of the hybrid sweeper-scrubber of FIG. 1.

FIG. 4 illustrates of an example of a control method 430 of the hybrid sweeper-scrubber of FIG. 1. At 432, power can be provided, via an electrical system alternator (e.g., 354, FIG. 3), to at least one cleaning function of a self-propelled hybrid vehicle. A cleaning function can include a number of accessories or sub-systems, as described herein in connection with FIGS. 1-3 and 5. Accessories can include a head light, signal lights, break lights, a horn, and the like.

At 434, an operational load can be monitored, including an operational state of the at least one cleaning function of the self-propelled hybrid vehicle. Operational load can include an engine power output threshold for the at least one cleaning functional to be operational. Operational state can include on/off or a percentage of full operational speed, power, torque, and the like.

At 436, a running state of the internal combustion engine (e.g., 352, FIG. 3) can be controlled based on the monitored operational load, so as to adjust the running speed of the internal combustion engine to a distinct running speed, so as to at least produce the monitored operational load. In an example, the running speed can be altered according to a number cleaning functions with an active operation state, so as to dictate an engine power output threshold for the at least one cleaning function to be in the active state. The running speed can be increased to provide greater power output than the monitored operational toad due to a number of additional environmental impacts on the load, so as to provide enough power for the at least one cleaning function to remain in an active operational state. Environmental impacts can include, but are not limited to, inclined or declined surfaces, surface types (e.g., smooth, rough, uneven, etc.), or ambient temperature.

The running speed can include an idle speed, so as to provide power output sufficient to charge the electrical system battery pack or operate an operational accessory. A threshold engine speed can be maintained for a number of cleaning functions to operate during a manual adjustment of the running speed of the engine, such as by an operator of the hybrid sweeper-scrubber. For example, the operator is able to increase and decrease the engine speed at will, but the main controller will not allow the engine to run slower than a power Output needed for the operational cleaning functions.

More particularly, the control method and control system can regulate engine speed or revolutions per minute (RPM) at a number of settings based on the number of operational cleaning functions, such as by monitoring the active cleaning functions that are in operation. The RPMs can be set at distinct values. For example, if only the sweep sub-system (e.g., 376, FIG. 5) is operational then a tower sweep RPM setting (RPM Setting #1) of the engine can be activated, such as about 1700 RPM to about 2500 RPM. However, if both the sweep sub-system and scrub sub-system (e.g., 378, FIG. 5) are being operated then a RPM setting (RPM Setting #2) higher than the lower sweep RPM setting on the engine can be activated, such as greater than about 2700 RPM.

The control method and system can regulate the engine speed based on a number of modes, including but not limited to: optional high pressure washer option can cause the engine to run at a lower RPM mode (RPM Setting #1); if the engine is in idle (RPM Setting Idle), the engine can run at a lower RPM mode (RPM Setting #1) when sweeping only or vacuuming only; if the engine is in idle or run, the engine can run in a higher RPM mode (RPM Setting #2) when scrubbing only or scrubbing and sweeping; if an operator override is activated, the operator can change between a higher RPM mode (RPM Setting #2) and a lower RPM mode (RPM Setting #1) at the operator's discretion; or, if the operator override condition goes away (e.g. sweep sub-system turns off) and the operator has not changed the engine mode, the engine can be returned to the mode before the forced override.

At 438, a threshold charge can be maintained, via the electrical system alternator (e.g., 154, FIG. 3), of the electrical system battery pack (e.g., 156, FIG. 3). For example, the amount of voltage stored in the electrical system battery pack can be maintained or optimized while the engine is running or the hybrid sweeper-scrubber is operational.

The electric mode can include monitoring the electrical system alternator for an occurrence of an electrical component fault, such as a voltage below a threshold voltage or an indication of a belt failure. The electrical system alternator can be monitored per a set time interval or continuously. Protective measures can be taken if the occurrence of an electrical component fault is detected, such as providing a warning to an operator, shutting down the self-propelled hybrid vehicle, or the like.

The hybrid mode can include monitoring the self-propelled hybrid vehicle for an occurrence of an engine component fault, such as the engine runs out of fuel, if the engine fails, if the engine generator fails, if the belt from the engine to engine alternator fails, etc. The running mode can be shifted to the electric mode if the occurrence of an engine component fault is detected. As described herein, the running mode can be altered by an operator if an override mode is activated.

If the machine is operating from the electrical system battery pack only, such as due to a failure in the engine or engine alternator as discussed herein or by operator override, the control system can monitor battery voltage of the electrical system battery pack until a threshold voltage condition is met. At such point, the control system can protect the hybrid sweeper-scrubber by shutting off machine cleaning functions and shutting down the hybrid sweeper-scrubber, FIG. 5 illustrates an exemplary schematic diagram of various components of a control method for the hybrid sweeper-scrubber of FIG. 1. An internal combustion engine (352) can be operably coupled to an electrical system alternator 354, such as via a belt 353. The electrical system alternator 354 can be configured to charge an electrical system battery pack 356 and operably coupled to a number of controllers 362, 364, 366. In an example the electrical system alternator 354 can be operably coupled to or through a fuse box 360. The number of controllers 362, 364, 366 can be operably coupled to the electrical system battery pack 356. Controller 364 can include a speed controller operably coupled to a drive system 370, so as to control the speed of the hybrid sweeper-scrubber. Controller 366 can include a steering control operably coupled to a steering system 372, so as to steer or provide directional capabilities to the hybrid sweeper-scrubber. Controller 362 can include a main controller configured to control a running state of the internal combustion engine 352 of the self-propelled hybrid vehicle based on a monitored operational load. The main controller 362 can be operably coupled to a user interface 368, an accessory, or a number of sub-systems 376, 378, 380, 382. The user interface 368 can be configured so as to indicate a status of a sub-system, a measurement, an alarm, a time, or the like. The main controller 362 can be configured to monitor the electrical system alternator 354 to detect failures, as described herein.

The sub-systems can include a sweep sub-system 376, a scrub sub-system 378, or a recovery sub-system 380, as described herein. Further, the control method and system can include an engine sub-system 380, such as an engine controller controlled by the main controller 362 or a computer processing unit associate with control logic for operation of the engine 352.

An engine alternator 358 can be operably coupled to an engine battery 360, so as to start the internal combustion engine 352, as described herein.

A switching component (not shown(can be configured to alternate the self-propelled hybrid vehicle between a number of running modes, the number of running modes including at least an electric mode and a hybrid mode, as described herein. A running state override switching component can be configured to override an operator initiated running state if the operator running initiated state is below a threshold run state based on the monitored operational load, as described herein.

In an example, the hybrid sweeper-scrubber can include a regenerative braking method or system to improve fuel efficiency, such as providing charge to the electrical system battery pack. The hybrid sweeper-scrubber control method and system can include a data acquisition system, so as to provide a number of measurements used in charge algorithms, running speed algorithms, failure mode detections, and the like.

In view of the foregoing, the hybrid sweeper-scrubber of the present invention provides numerous advantages including, but not limited to, fuel savings, tower emissions, and lower sounds.

In summary, the main alternator in the hybrid sweeper-scrubber is sized to provide power to all of the cleaning functions of the machine, with the exception of the engine system, and for maintaining a charge on the main system battery pack during operation. The main system battery pack provides a "buffer" to handle the inrush currents and heavy load currents that exceed the capacity of the main alternator. Such "heavy loads" may be caused by sweeping/scrubbing up inclines, etc. Additionally, the main system battery pack is not merely a "back-up" source of power. Rather, the sweeper-scrubber is fully operational the battery operated mode for an extended period of time, such as the duration of the charge.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents no incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed:

1. A method, comprising:
   starting an internal combustion engine of a self-propelled hybrid vehicle via an electric motor;
   providing power, via an electrical system alternator, to at least one cleaning function of the self-propelled hybrid vehicle;
   monitoring an operational load, including an operational state of the at least one cleaning function of the self-propel led hybrid vehicle;
   controlling a running state of the internal combustion engine to produce a power output based on the monitored operational load;
   maintaining a threshold charge, via the electrical system alternator, of an electrical system battery pack of the self-propelled hybrid vehicle; and
   charging an engine battery of the self-propelled hybrid vehicle via an engine alternator.

2. The method of claim 1, further comprising alternating between a number of running modes of the self-propelled hybrid vehicle, the number of running modes including at least an electric mode and a hybrid mode.

3. The method of claim 2, wherein running the electric mode further comprises:
   monitoring the electrical system alternator for an occurrence of an electrical component fault; and
   taking protective measures if the occurrence of an electrical component fault is detected, protective measures including at least one of:
   providing a warning to an operator; and
   shutting down the self-propelled hybrid vehicle.

4. The method of claim 2, wherein running the hybrid mode further comprises:
   monitoring the self-propelled hybrid vehicle for an occurrence of an engine component fault; and
   alternating to the electric mode if the occurrence of an engine component fault is detected.

5. The method of claim 2, further comprising overriding alternating between the number of running modes if an override mode is activated.

6. The method of claim 3, including monitoring the electrical system alternator at a designated time interval.

7. The method of claim 1, wherein controlling the running state includes adjusting a running speed of the internal combustion engine to a distinct running speed to produce the power output based on the monitored operational load.

8. The method of claim 7, further comprising adjusting the running speed based on a number of cleaning functions with an active operation state.

9. The method of claim 7, further comprising adjusting the running speed when the monitored operational load is greater than at least a threshold operational load.

10. The method of claim 7, further comprising adjusting the running speed to an idle speed.

11. The method of claim 7, further comprising maintaining at least a threshold engine speed for a number of cleaning functions to operate during a manual adjustment of the running speed of the engine.

12. A method, comprising:
    starting an internal combustion engine of a self-propelled hybrid vehicle via an electric motor;
    providing power, via an electrical system alternator, to at least one cleaning function of the self-propelled hybrid vehicle;
    monitoring an operational load, including an operational state of the at least one cleaning function of the self-propelled hybrid vehicle;
    controlling a running state of the internal combustion engine to produce a power output based on the monitored operational load, wherein controlling the running state includes adjusting a running speed of the internal combustion engine to a distinct running speed to produce the power output based on the monitored operational load;
    adjusting the running speed when the monitored operational load is greater than at least a threshold operational load;

alternating between a number of running modes of the self-propelled hybrid vehicle, the number of running modes including at least an electric mode and a hybrid mode;

overriding alternating between the number of running modes if an override mode is activated;

maintaining a threshold charge, via the electrical system alternator, of an electrical system battery pack of the self-propelled hybrid vehicle; and charging an engine battery of the self-propelled hybrid vehicle via an engine alternator.

13. A method, comprising:

starting an internal combustion engine of a self-propelled hybrid vehicle;

providing power, via an electrical system alternator, to at least one cleaning function of the self-propelled hybrid vehicle;

monitoring an operational load, including an operational state of the at least one cleaning function of the self-propelled hybrid vehicle;

controlling a running state of the internal combustion engine to produce a power output based on the monitored operational load;

maintaining a threshold charge, via the electrical system alternator, of an electrical system battery pack of the self-propelled hybrid vehicle; and charging an engine battery of the self-propelled hybrid vehicle via an engine alternator.

* * * * *

UNITED STATES PATENT AND TRADEMARK OFFICE
CERTIFICATE OF CORRECTION

PATENT NO. : 9,937,918 B2
APPLICATION NO. : 14/113137
DATED : April 10, 2018
INVENTOR(S) : Johnson et al.

Page 1 of 1

It is certified that error appears in the above-identified patent and that said Letters Patent is hereby corrected as shown below:

On the Title Page

In item (73), in "Assignee", in Column 1, Line 1, delete "Brondby" and insert --Brøndby-- therefor In the Claims In Column 9, Line 64, in Claim 1, delete "self-propel led" and insert --self-propelled-- therefor Signed and Sealed this
Fifth Day of January, 2021

Andrei Iancu
*Director of the United States Patent and Trademark Office*